United States Patent
Miyazawa et al.

(10) Patent No.: US 8,638,345 B2
(45) Date of Patent: Jan. 28, 2014

(54) PROGRAM GENERATION DEVICE, PROGRAM GENERATION METHOD, AND COMPUTER-READABLE STORAGE MEDIUM

(75) Inventors: Yukou Miyazawa, Tokyo (JP); Takahiro Ohori, Tokyo (JP); Kazuya Anzawa, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 250 days.

(21) Appl. No.: 12/945,148

(22) Filed: Nov. 12, 2010

(65) Prior Publication Data

US 2011/0109647 A1  May 12, 2011

(30) Foreign Application Priority Data

Nov. 12, 2009 (JP) ................. 2009-258823

(51) Int. Cl.
*G09G 5/02* (2006.01)

(52) U.S. Cl.
USPC ............................ 345/661; 715/762; 345/648

(58) Field of Classification Search
None
See application file for complete search history.

(56) References Cited

U.S. PATENT DOCUMENTS

| | | |
|---|---|---|
| 8,228,347 B2 * | 7/2012 | Beasley et al. ............ 345/665 |
| 2003/0069897 A1 * | 4/2003 | Roy et al. ................. 707/104.1 |
| 2009/0043199 A1 * | 2/2009 | Pelissier et al. ............ 600/437 |
| 2009/0265660 A1 | 10/2009 | Nobori |
| 2011/0009188 A1 * | 1/2011 | Adiraju et al. ............... 463/25 |

FOREIGN PATENT DOCUMENTS

| | | |
|---|---|---|
| EP | 2042985 A2 | 4/2009 |
| JP | 10-326169 | 12/1998 |
| JP | 2004-133532 | 4/2004 |
| JP | 2004-151284 | 5/2004 |
| JP | 2004-312430 | 11/2004 |

OTHER PUBLICATIONS

European Search Report for EP Application No. 10190828.3-1243 dated Jul. 14, 2011.
XP-002646674—Space-time tradeoff—Wikipedia.
EP Application No. 10 190 828.3-1243 Examination Report; Date Mailed Aug. 8, 2011.
Office Action for Korean Patent Application No. 10-2010-0112513, dated May 29, 2012.
Office Action for corresponding Chinese application 201010546851.8 dated Mar. 25, 2013.

* cited by examiner

*Primary Examiner* — James A Thompson
*Assistant Examiner* — David H Chu
(74) *Attorney, Agent, or Firm* — MKG, LLC (57) ABSTRACT

A program generation device (11) for generating a control program for causing a display device (30) to display an image in different display sizes comprises: a determination unit (116) that determines a conversion image size based on the different display sizes of the image; a conversion unit (117) that converts an item of image data representing the image into an item of image data having an image size equal to the conversion image size; and a generation unit (118) that generates a control program for causing the display device to display the image in different display sizes by using the item of image data converted by the conversion unit.

17 Claims, 8 Drawing Sheets

SCREEN SIZE TABLE

| MODEL NAME | SCREEN SIZE |
|---|---|
| A | 480×640 |
| B | 240×320 |
| C | 768×1024 |
| D | 480×800 |
| ⋮ | ⋮ |

AREA COORDINATE INFORMATION(1)

| No. | POSITION | DISPLAY SIZE | DATA NAME |
|---|---|---|---|
| 1 | (sx1,sy1) | (dsx1,dsy1) | A.jpg |
| 2 | (sx2,sy2) | (dsx2,dsy2) | B.jpg |
| 3 | (sx3,sy3) | (dsx3,dsy3) | C.jpg |
| 4 | (sx4,sy4) | (dsx4,dsy4) | D.jpg |
| ⋮ | ⋮ | ⋮ | ⋮ |

AREA COORDINATE INFORMATION(2)

| No. | POSITION | DISPLAY SIZE | DATA NAME |
|---|---|---|---|
| 1 | (sx5,sy5) | (dsx5,dsy5) | C.jpg |
| 2 | (sx6,sy6) | (dsx6,dsy6) | J.jpg |
| 3 | (sx7,sy7) | (dsx7,dsy7) | Q.jpg |
| 4 | (sx8,sy8) | (dsx8,dsy8) | R.jpg |
| ⋮ | ⋮ | ⋮ | ⋮ |

FIG. 8  CALCULATED COORDINATE INFORMATION(1)

| No. | POSITION | DISPLAY SIZE | DATA NAME |
|---|---|---|---|
| 1 | (x1,y1) | (dx1,dy1) | A.jpg |
| 2 | (x2,y2) | (dx2,dy2) | B.jpg |
| 3 | (x3,y3) | (dx3,dy3) | C.jpg |
| 4 | (x4,y4) | (dx4,dy4) | D.jpg |
| ⋮ | ⋮ | ⋮ | ⋮ |

CALCULATED COORDINATE INFORMATION(2)

| No. | POSITION | DISPLAY SIZE | DATA NAME |
|---|---|---|---|
| 1 | (x5,y5) | (dx5,dy5) | C.jpg |
| 2 | (x6,y6) | (dx6,dy6) | J.jpg |
| 3 | (x7,y7) | (dx7,dy7) | Q.jpg |
| 4 | (x8,y8) | (dx8,dy8) | R.jpg |
| ⋮ | ⋮ | ⋮ | ⋮ |

ARRANGEMENT COORDINATE INFORMATION(1)

| No. | POSITION | DISPLAY SIZE | DATA NAME |
|---|---|---|---|
| 1 | (x1,y1) | (dx1,dy1) | At.jpg |
| 2 | (x2,y2) | (dx2,dy2) | Bt.jpg |
| 3 | (x3,y3) | (dx3,dy3) | Ct.jpg |
| 4 | (x4,y4) | (dx4,dy4) | Dt.jpg |
| ⋮ | ⋮ | ⋮ | ⋮ |

ARRANGEMENT COORDINATE INFORMATION(2)

| No. | POSITION | DISPLAY SIZE | DATA NAME |
|---|---|---|---|
| 1 | (x5,y5) | (dx5,dy5) | Ct.jpg |
| 2 | (x6,y6) | (dx6,dy6) | Jt.jpg |
| 3 | (x7,y7) | (dx7,dy7) | Qt.jpg |
| 4 | (x8,y8) | (dx8,dy8) | Rt.jpg |
| ⋮ | ⋮ | ⋮ | ⋮ |

PROGRAM GENERATION DEVICE, PROGRAM GENERATION METHOD, AND COMPUTER-READABLE STORAGE MEDIUM

CROSS-REFERENCE TO RELATED APPLICATIONS

This application is based on and claims priority under 35 U.S.C. 119 from Japanese Patent Application No. 2009-258823, which was filed on Nov. 12, 2009.

TECHNICAL FIELD

The present invention relates to a technology for compiling a program.

BACKGROUND OF THE INVENTION

Various types of terminals having a display screen, such as mobile phones, are widely used. A number of pixels that can be displayed on a display screen at one time (hereinafter, "screen size") varies depending on a type of a terminal. Therefore, it is necessary that a number of pixels of an image (hereinafter, "image size") to be displayed on a display screen of a terminal be converted according to the size of the display screen used, so that a layout is correctly maintained.

SUMMARY OF THE INVENTION

A terminal having a display screen, such as a mobile phone, can implement a variety of functions by executing a control program. A commonly used function is that of displaying an image on a display screen. A control program having such a function is generated for respective terminals having different screen sizes, such that the control program converts an image size according to a screen size of each terminal before each image is displayed.

When a control program corresponding to each terminal is executed, a conversion process is performed on image data that has been compiled together with the control program, to convert an image size into a size appropriate for the screen size before each image is displayed. Therefore, a processing load for executing the conversion tends to be large, and this leads to decreased operation speed.

On the other hand, to avoid a necessity of conducting conversion of an image size in each terminal, it may be conceived to convert image sizes of the images to be displayed in advance, and to compile image data representing the images of the converted image sizes. However, in a case where the same image is displayed multiple times in varying image display sizes, it is necessary to generate image data representing the same image in different image display sizes, and therefore, an amount of image data to be compiled tends to be very large, though the processing load may be decreased.

The present invention is made in view of the background described above, and an object of the present invention is, when a control program for displaying an image in different image display sizes is generated, to reduce an amount of image data used with the control program, while at the same time reducing a processing load on a terminal that executes the control program.

To achieve the above-mentioned object, according to one aspect of the present invention, there is provided a program generation device that generates a control program, which, when executed by a display device having a display screen, causes the display device to implement a function of displaying a plurality of images using an item of image data representing a specific image having a specific image size, as a series of displays shown on the display screen, wherein at least one of the plurality of images is obtained by converting the specific image having the specific image size such that the at least one of the plurality of images has an image size different from the specific image size, the program generation device comprising: an image data acquisition unit that acquires an item of image data representing the specific image having a predetermined image size; a display control unit that causes a screen area, which resembles the display screen of the display device, to be displayed on a display screen of a device that is different from the display device; a designation unit that designates a plurality of areas in the screen area caused to be displayed by the display control unit, each of the plurality of areas corresponding to a position and a display size at and in which the specific image is to be displayed in the series of displays; an area acquisition unit that acquires a display position and a display size of each of the plurality of areas in the screen area designated by the designation unit; a screen size acquisition unit that acquires a screen size representing a number of pixels that can be displayed on the display screen of the display device at a time; a calculation unit that, based on the display position and the display size of each of the plurality of areas in the screen area acquired by the area acquisition unit and the screen size acquired by the screen size acquisition unit, calculates a display position and a display size of each of the plurality of areas in the display screen having the screen size; a determination unit that determines the specific image size based on the display sizes of the plurality of areas calculated by the calculation unit; a conversion unit that converts the item of image data acquired by the image data acquisition unit into an item of image data representing the specific image having the specific image size determined by the determination unit; and a generation unit that generates a control program for causing the display device to display the specific image by using the item of image data converted by the conversion unit, such that, in a series of displays shown on the display screen of the display device, the specific image is displayed at the position of each of the plurality of areas calculated by the calculation unit and in the size calculated by the same.

In a preferred embodiment of the present invention, the determination unit determines the specific image size such that a sum of an amount of data of the control program generated by the generation unit and an amount of data of the item of image data converted by the conversion unit does not exceed a predetermined value.

In another preferred embodiment of the present invention, the determination unit determines a plurality of specific image sizes based on the display sizes of the plurality of areas calculated by the calculation unit, the conversion unit converts the item of image data acquired by the image data acquisition unit into a plurality of items of image data representing the specific image in respective ones of the plurality of specific image sizes determined by the determination unit, and the generation unit uses the plurality of items of image data generated by the conversion unit.

In another preferred embodiment of the present invention, the determination unit determines a number of the plurality of specific image sizes such that a sum of an amount of data of the control program generated by the generation unit and an amount of data of the plurality of items of image data converted by the conversion unit does not exceed a predetermined value.

In another preferred embodiment of the present invention, the determination unit determines the specific image size as a size having a height and a width that respectively are an integer multiple or an integer fraction of a height and a width of the display size of each of the plurality of areas.

In another preferred embodiment of the present invention, the designation unit further designates a trimming range of the specific image for each of the plurality of areas, and the generation unit generates a control program for causing the display device to display the specific image in the trimming range designated by the designation unit at the display position corresponding to each of the plurality of areas calculated by the calculation unit, after converting the specific image in the trimming range to have an image size equal to the display size calculated by the calculation unit.

In another preferred embodiment of the present invention, the specific image size determined by the determination unit is smaller than the predetermined image size of the specific image represented by the item of image data acquired by the image data acquisition unit.

In another preferred embodiment of the present invention, the determination unit determines the specific image size as one of the display sizes of the plurality of areas calculated by the calculation unit.

In another preferred embodiment of the present invention, the determination unit determines the specific image size as a size other than the display sizes of the plurality of areas calculated by the calculation unit.

According to another aspect of the present invention, there is provided a non-transitory computer-readable storage medium storing a program for causing a computer to generate a control program, which, when executed by a display device having a display screen, causes the display device to implement a function of displaying a plurality of images using an item of image data representing a specific image having a specific image size, as a series of displays shown on the display screen, wherein at least one of the plurality of images is obtained by converting the specific image having the specific image size such that the at least one of the plurality of images has an image size different from the specific image size, the program causing the computer to function as: an image data acquisition unit that acquires an item of image data representing the specific image having a predetermined image size; a display control unit that causes a screen area, which resembles the display screen of the display device, to be displayed on a display screen of a device that is different from the display device; a designation unit that designates a plurality of areas in the screen area caused to be displayed by the display control unit, each of the plurality of areas corresponding to a position and a display size at and in which the specific image is to be displayed in the series of displays; an area acquisition unit that acquires a display position and a display size of each of the plurality of areas in the screen area designated by the designation unit; a screen size acquisition unit that acquires a screen size representing a number of pixels that can be displayed on the display screen of the display device at a time; a calculation unit that, based on the display position and the display size of each of the plurality of areas in the screen area acquired by the area acquisition unit and the screen size acquired by the screen size acquisition unit, calculates a display position and a display size of each of the plurality of areas in the display screen having the screen size; determination unit that determines the specific image size based on the display sizes of the plurality of areas calculated by the calculation unit; a conversion unit that converts the item of image data acquired by the image data acquisition unit into an item of image data representing the specific image having the specific image size determined by the determination unit; and a generation unit that generates a control program for causing the display device to display the specific image by using the item of image data converted by the conversion unit, such that, in a series of displays shown on the display screen of the display device, the specific image is displayed at the position of each of the plurality of areas calculated by the calculation unit and in the size calculated by the same.

According to yet another aspect of the present invention, there is provided a program generation method of generating a control program, which, when executed by a display device having a display screen, causes the display device to implement a function of displaying a plurality of images using an item of image data representing a specific image having a specific image size, as a series of displays shown on the display screen, wherein at least one of the plurality of images is obtained by converting the specific image having the specific image size such that the at least one of the plurality of images has an image size different from the specific image size, the method comprising: an image data acquisition step for acquiring an item of image data representing the specific image having a predetermined image size; a display control step for causing a screen area, which resembles the display screen of the display device, to be displayed on a display screen of a device that is different from the display device; a designation step for designating a plurality of areas in the screen area caused to be displayed by the display control step, each of the plurality of areas corresponding to a position and a display size at and in which the specific image is to be displayed in the series of displays; an area acquisition step for acquiring a display position and a display size of each of the plurality of areas in the screen area designated by the designation unit; a screen size acquisition step for acquiring a screen size representing a number of pixels that can be displayed on the display screen of the display device at a time; a calculation step for, based on the display position and the display size of each of the plurality of areas in the screen area acquired by the area acquisition step and the screen size acquired by the screen size acquisition step, calculating a display position and a display size of each of the plurality of areas in the display screen having the screen size; a determination step for determining the specific image size based on the display sizes of the plurality of areas calculated by the calculation step; a conversion step for converting the item of image data acquired by the image data acquisition step into an item of image data representing the specific image having the specific image size determined by the determination step; and a generation step for generating a control program for causing the display device to display the specific image by using the item of image data converted by the conversion step, such that, in a series of displays shown on the display screen of the display device, the specific image is displayed at the position of each of the plurality of areas calculated by the calculation step and in the size calculated by the same.

According to the present invention, when a control program for displaying an image in different image display sizes is generated, it is possible to reduce an amount of image data used with the control program, while at the same time reducing a processing load on a terminal that executes the control program.

BRIEF DESCRIPTION OF THE DRAWINGS

Exemplary embodiments of the present invention will now be described in detail with reference to the following figures, wherein.

DETAILED DESCRIPTION

Figure 1:
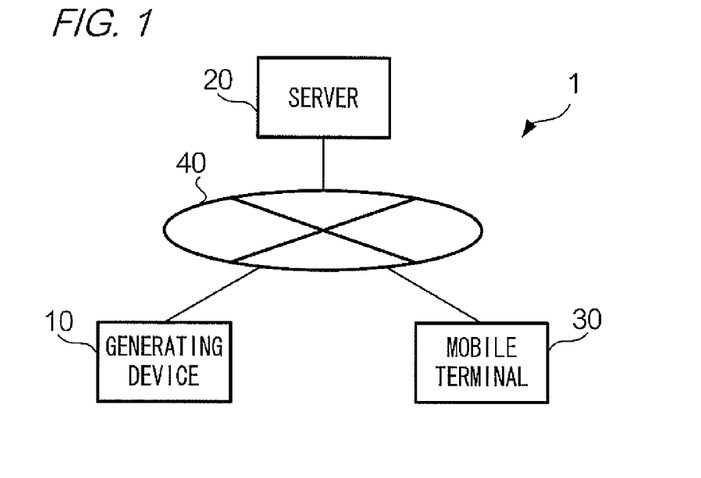
FIG. 1 is a block diagram showing a configuration of a program-providing system according to an exemplary embodiment of the present invention.

FIG. 1 is a block diagram showing a configuration of program-providing system 1 according to an exemplary embodiment of the present invention. Program-providing system 1 includes generating device 10, server 20, mobile terminal 30, and communication network 40 that connects these devices so that they can communicate with one another. Mobile terminal 30, such as a mobile phone, a PDA (Personal Digital Assistant), or the like, is an example of a display device having a display screen.

Generating device 10 generates a control program that is to be executed in mobile terminal 30 or the like, and compiles the control program together with data relating to the control program (in this example, image data or the like) to form an archive file, which is uploaded to server 20. This archive file corresponds to a JAR (Java ARchive) file used in a JAVA (registered trademark) environment, for example. It is to be noted that the control program may be any program written in a programming language, and particularly, may be a program written in a simple programming language such as a script language.

Mobile terminal 30 downloads an archive file corresponding to the model of mobile terminal 30 from among the archive files uploaded to server 20, and executes the control program included in the archive file. When the control program is executed, mobile terminal 30 displays images on its display screen 300 (see FIG. 9) according to arrangement coordinate information included in the control program, in a series of displays shown as a result of the execution of the control program.

A screen size of display screen 300 may vary depending on the model of mobile terminal 30. It is to be noted that, although a single mobile terminal 30 is connected to communication network 40 in FIG. 1, multiple mobile terminals may be connected.

Next, explanation will be given of a configuration of generating device 10.

Figure 2:
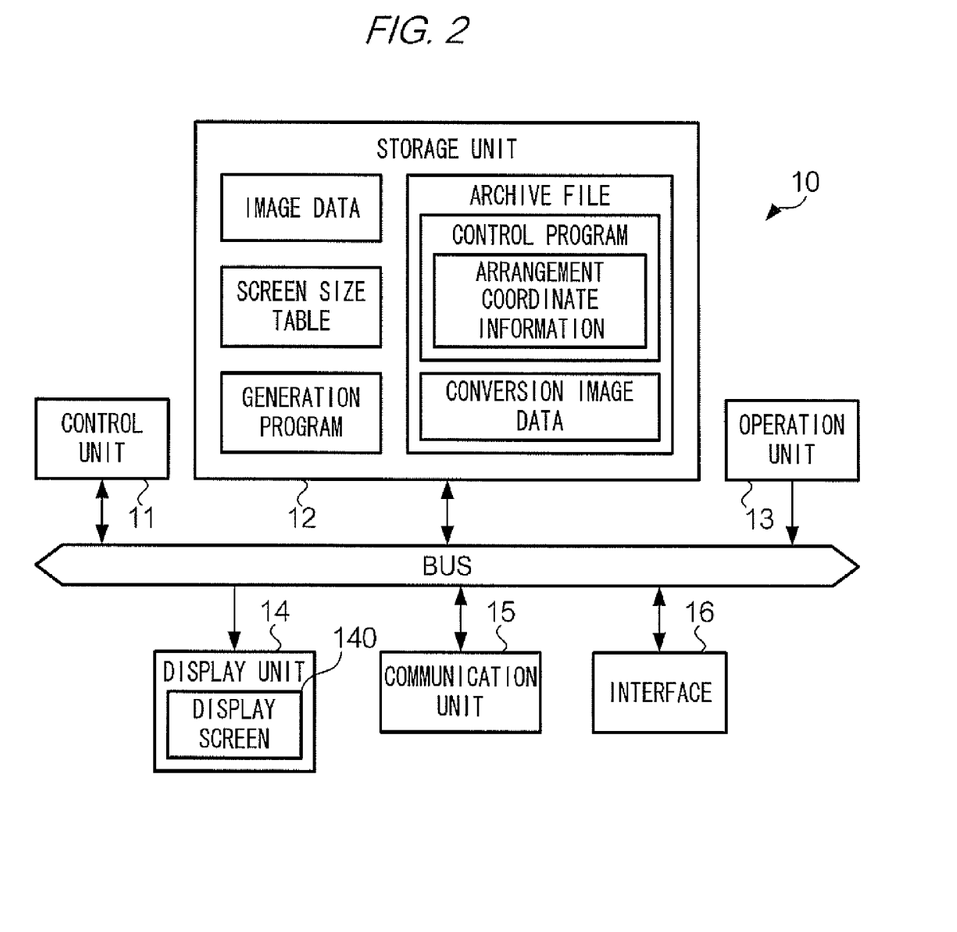
FIG. 2 is a block diagram showing a configuration of a generating device according to the exemplary embodiment of the present invention.

FIG. 2 is a block diagram showing a configuration of generating device 10 according to the exemplary embodiment of the invention. Generating device 10 includes control unit 11, storage unit 12, operation unit 13, display unit 14, communication unit 15, and interface 16, which are connected with one another via a bus.

Control unit 11 includes a CPU (Central Processing Unit), a ROM (Read Only Memory), a RAM (Random Access Memory), and so on. The CPU loads a generation program stored in storage unit 12 to the RAM and executes the same, thereby to control respective units of generating device 10 via the bus to implement a program generation function, which will be described later. Further, the CPU loads various programs stored in the ROM to the RAM and executes them to implement various functions. The RAM not only serves as a work area when the CPU processes various items of data, but also is used as a buffer memory for items of coordinate information, which will be described later.

Storage unit 12 is a storage means such as a non-volatile memory or a hard disk, for example, and stores various items of information described in detail below. It is to be noted that storage unit 12 may be an external storage medium, such as a non-volatile memory, that is connected via a connection interface.

In this example, the information stored in storage unit 12 includes items of image data representing images, a generation program for implementing a program generation function, an archive file(s) as described above, and a screen size table.

Image data is data that represents images used when a control program is generated by the program generation function, and these images have varying image sizes depending on respective items of image data. As described above, an image size represents a number of pixels of an image, and in this example, is expressed by a number of pixels in width and height. For example, for an image having a width of 1,000 pixels and a height of 500 pixels, the image size is expressed as "1,000×500."

An archive file is constituted of a control program generated by the program generation function and conversion image data to be used by the control program, where the control program is compiled together with the conversion image data. The control program includes arrangement coordinate information that specifies a display position, a display size, and so on of each image represented by the conversion image data. The conversion image data and the arrangement coordinate information will be described later.

Figure 3:
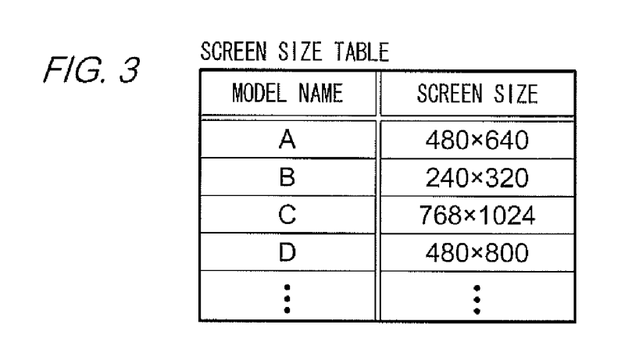
FIG. 3 is a diagram for explaining an image size table stored in the generating device according to the exemplary embodiment of the present invention.

FIG. 3 is a diagram for explaining a screen size table. A screen size table is a table that associates a screen size of display screen 300 of mobile terminal 30 with a model of mobile terminal 30. For example, for model A, the screen size is "480×640," which indicates that, in this example, a number of pixels that can be displayed by the display screen at one time is 480 pixels in width and 640 pixels in height, i.e., a VGA (Video Graphics Array) having a longer side extending in the vertical direction.

Operation unit 13 includes an input device such as a keyboard, a mouse, or the like, and in response to an operation of the input device by a user, outputs data representing content of the operation to control unit 11. By operating the input device, a user can designate and determine a display position and a display size of an image, designate a model of a mobile terminal corresponding to the control program to be generated, and make various kinds of settings during execution of the program generation function.

Display unit 14 is a display device, such as a liquid crystal display, having display screen 140 for displaying an image. Display unit 14 causes display screen 140 to display an image according to control of control unit 11. For example, when the program generation function is implemented, content displayed on display screen 140 is controlled by display control unit 112, which will be described later. Further, under the control of control unit 11, various modes of display such as display in response to a user's operation, display of a menu, display of a setting screen, etc. may be carried out.

It is to be noted that, though generating device 10 includes display unit 14 in the illustrated embodiment, a display device having a display screen may be connected via an interface.

Communication unit 15 communicates with server 20 via communication network 40 under control of control unit 11, and in this example, uploads an archive file to server 20.

Interface 16 is a connection terminal or the like for a wired connection with an external device for transmission/reception of a variety of information with the external device. The foregoing is a description of the configuration of generating device 10.

Next, explanation will be given of a program generation function implemented by execution of a generation program by control unit 11 of generating device 10. The program generation function is a function of generating a control program to be executed in mobile terminal 30, and generating an archive file in which the control program and data used with the control program are compiled. It is to be noted that each functional unit of the program generation function, which unit will be described below, may be provided as hardware.

Figure 4:
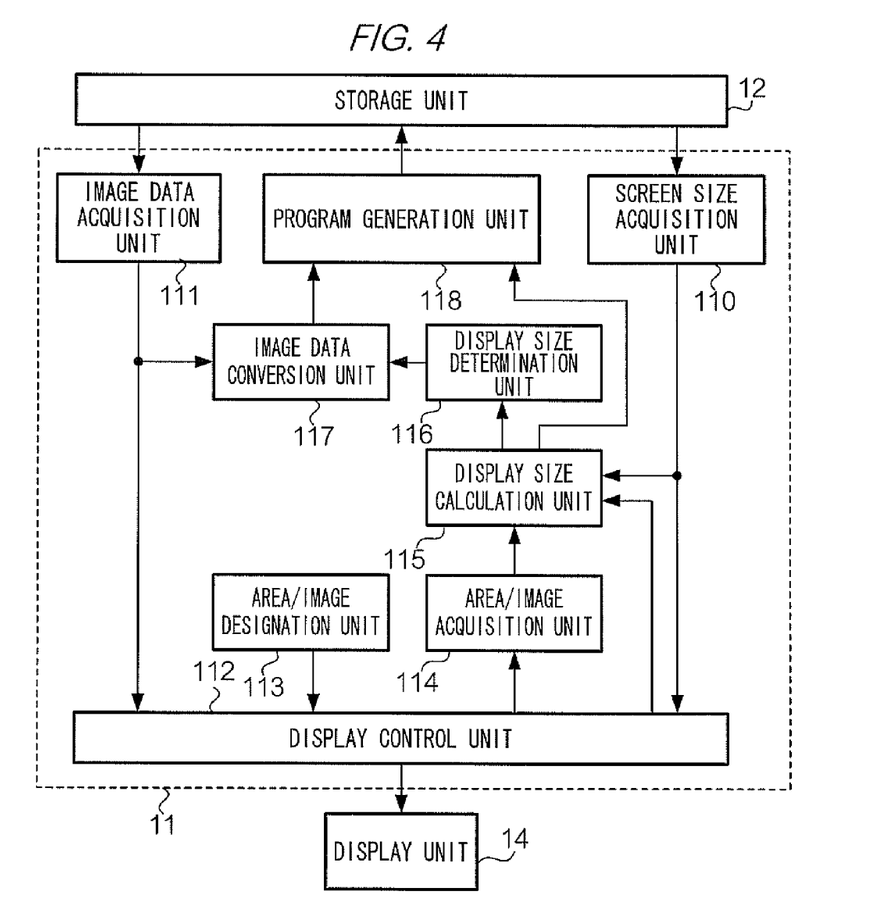
FIG. 4 is a block diagram showing a program generation function according to the exemplary embodiment of the present invention.

FIG. 4 is a block diagram showing a program generation function according to the exemplary embodiment of the present invention. To carry out the program generation function, there are used screen size acquisition unit 110, image data acquisition unit 111, display control unit 112, area/image designation unit 113, area/image acquisition unit 114, display size calculation unit 115, display size determination unit 116, image data conversion unit 117, and program generation unit 118.

When a model of mobile terminal 30 corresponding to a control program to be generated is designated by an operation of operation unit 13 by a user, screen size acquisition unit 110 acquires a screen size corresponding to the model by referring to the screen size table, and outputs screen size information representing the screen size to display control unit 112 and display size calculation unit 115. This operation by a user can be performed prior to operation of each unit for the program generation function.

Image data acquisition unit 111 acquires image data stored in storage unit 12, and outputs the data to display control unit 112. Further, image data acquisition unit 111 outputs the image data to image data conversion unit 117 in response to a request from image data conversion unit 117.

As is described above, display control unit 112 controls content displayed on display screen 140 of display unit 14. This displayed content is a setting screen for allowing a user to set content that will be displayed on display screen 300 of mobile terminal 30 when a generated control program is executed in mobile terminal 30, and examples of which displayed content are shown in FIGS. 5A and 5B.

Figure 5A:
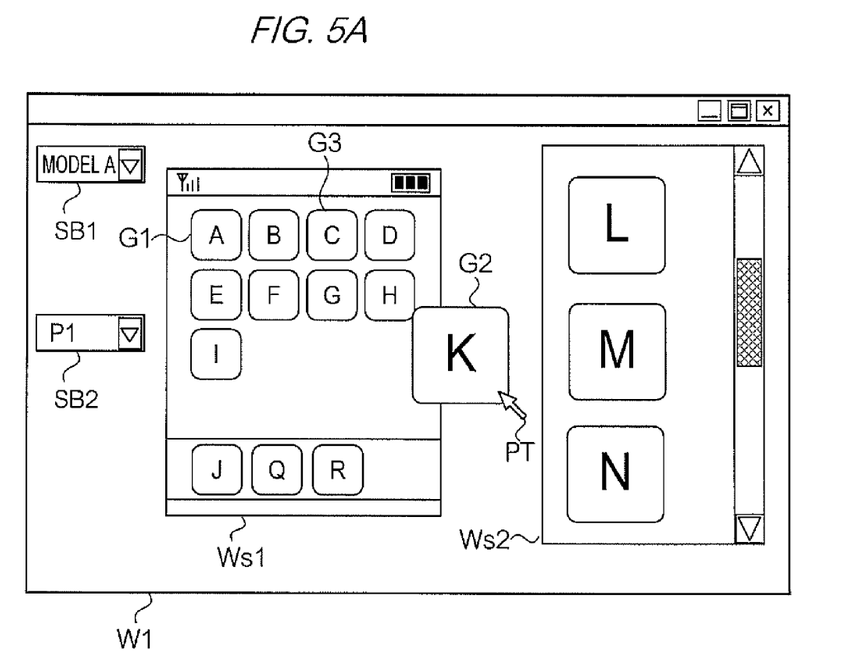
FIGS. 5A and 5B are each a diagram for explaining content caused to be displayed by the program generation function according to the exemplary embodiment of the present invention.
Figure 5B:
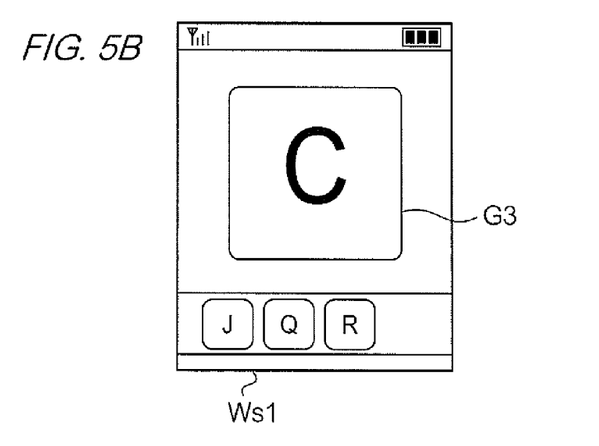

FIGS. 5A and 5B are each a diagram for explaining content caused to be displayed by the program generation function according to the exemplary embodiment of the present invention. As shown in FIG. 5A, display screen 140 shows window W1 that is used in the program generation function. In window W1, there are shown selection boxes SB1 and SB2, sub-windows Ws1 and Ws2, pointer PT, and so on.

Sub-window Ws1 is a display for setting content to be displayed on display screen 300 of mobile terminal 30. The aspect ratio of this sub-window Ws1 is the same as that of the screen size acquired by screen size acquisition unit 110; that is, sub-window Ws1 resembles display screen 300 of mobile terminal 30 whose screen size was acquired by screen size acquisition unit 110. By operating operation unit 13 to arrange images in this sub-window Ws1, a user can set content to be displayed on display screen 300 of mobile terminal 30. For example, image G1 in FIG. 5A is an image of an icon representing "A."

Sub-window Ws2 shows images represented by the image data output from image data acquisition unit 111, i.e., the image data stored in storage unit 12. A display size of each image displayed in this sub-window Ws2 may not be the same as the image size, and is adjusted appropriately so that each image is shown within sub-window Ws2. It is to be noted, however, that the display size of an image displayed in sub-window Ws2 may be the same as the image size.

Selection box SB1 is used when a user designates a model of mobile terminal 30, based on which screen size acquisition unit 110 acquires a screen size, as described above. Selection box SB1 is a pull-down menu for allowing a user to select a model from the models registered in the screen size table stored in storage unit 12. Upon selection of a model by a user using selection box SB1 to designate the model, the above-described process of screen size acquisition unit 110 is conducted.

Selection box SB2 is a pull-down menu for switching between pages of the screen for which display content is set. A "page" here is a part of a series of displays that may be shown on display screen 300 of mobile terminal 30 when a generated control program is executed by mobile terminal 30, and is based on a screen displayed on display screen 300. Upon selection of a page by a user using selection box SB2 to designate the page, display content of sub-window Ws1 is switched to that corresponding to the designated page. FIG. 5A shows display content of sub-window Ws1 corresponding to page "P1," and when the page is switched to page "P2," the display content of sub-window Ws1 is switched to that shown in FIG. 5B, which, in this example, includes image G3 (an image of an icon representing "C") shown in an enlarged state. Thus, each of a series of displays consists of display content set for a respective page.

Pointer PT is an operator displayed on display screen 140 and controllable by an operation of operation unit 13 by a user. A user can perform the above-described selection using selection boxes SB1 and SB2 by operating operation unit 13 to manipulate the operator.

Also, a user can operate operation unit 13 to manipulate the operator to drag an image in sub-window Ws2 (image G2 of an icon representing "K" in the example shown in FIG. 5A) to within sub-window Ws1, and adjust a size (hereinafter, "display size") of the image by shrinking or enlarging the image, thereby to set the content to be displayed on display screen 300 of mobile terminal 30. It is to be noted that, instead of manipulating pointer PT to adjust a position and/or display size of an image, a user may operate a keyboard of operation unit 13 to input numbers indicating a position and/or a display size of an image, for example, to achieve the adjustment. Switching of these adjustment means may be made in response to a predetermined operation.

When an instruction of area/image determination is received from area/image designation unit 113, display control unit 112 outputs to area/image acquisition unit 114 information for designating areas in a screen area of sub-window Ws1 of each page in which images are located, and for designating the images located in these areas. Further, display control unit 112 outputs screen area size information that represents a size of a screen area of sub-window Ws1 (hereinafter, "screen area size") to display size calculation unit 115.

Explanation will be continued referring again to FIG. 4. Area/image designation unit 113 provides instruction of area determination to display control unit 112 in response to a user's operation of operation unit 13 to determine the display content set for each page, so that information for designating areas in sub-window Ws1 in which images are located is forwarded to area/image acquisition unit 114, as described above.

Upon acquisition from display control unit 112 of information for designating an area of each image located in the screen area of sub-window Ws1 of each page, area/image acquisition unit 114 generates area coordinate information based on the acquired information, and outputs the area coordinate information to display size calculation unit 115. The area coordinate information is information that represents a position and a size of each of the areas in the screen area of sub-window Ws1 in which respective images are located. Detailed explanation will be given of the area coordinate information with reference to FIGS. 6 and 7.

Figure 6:
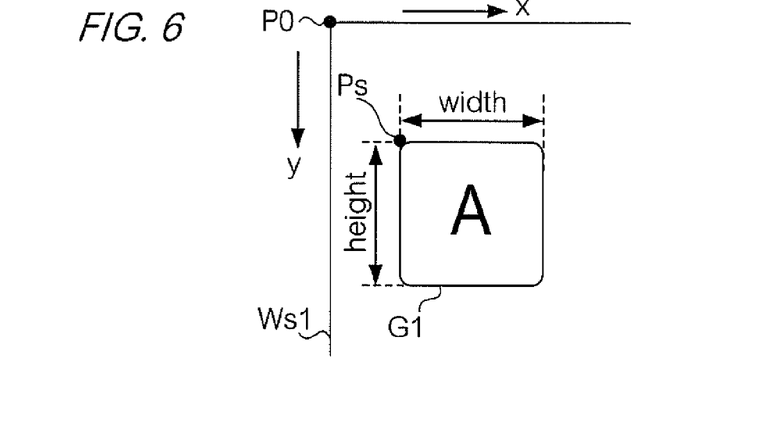
FIG. 6 is a diagram for explaining coordinate information according to the exemplary embodiment of the present invention.

FIG. 6 is a diagram for explaining a definition of a coordinate indicated by each item of coordinate information. As shown in FIG. 6, a coordinate indicated in each item of coordinate information is obtained with the upper left position of the screen area of sub-window Ws1 being origin P0, the rightward direction being the positive x-direction, and the downward direction being the positive y-direction. Also, the upper left position of an image located in sub-window Ws1 is display position Ps of the image, and a display size of the image is represented by a horizontal length (width) and a vertical length (height) from display position Ps. These lengths are represented by a number of pixels when the image is displayed on display screen 140.

Figure 7:
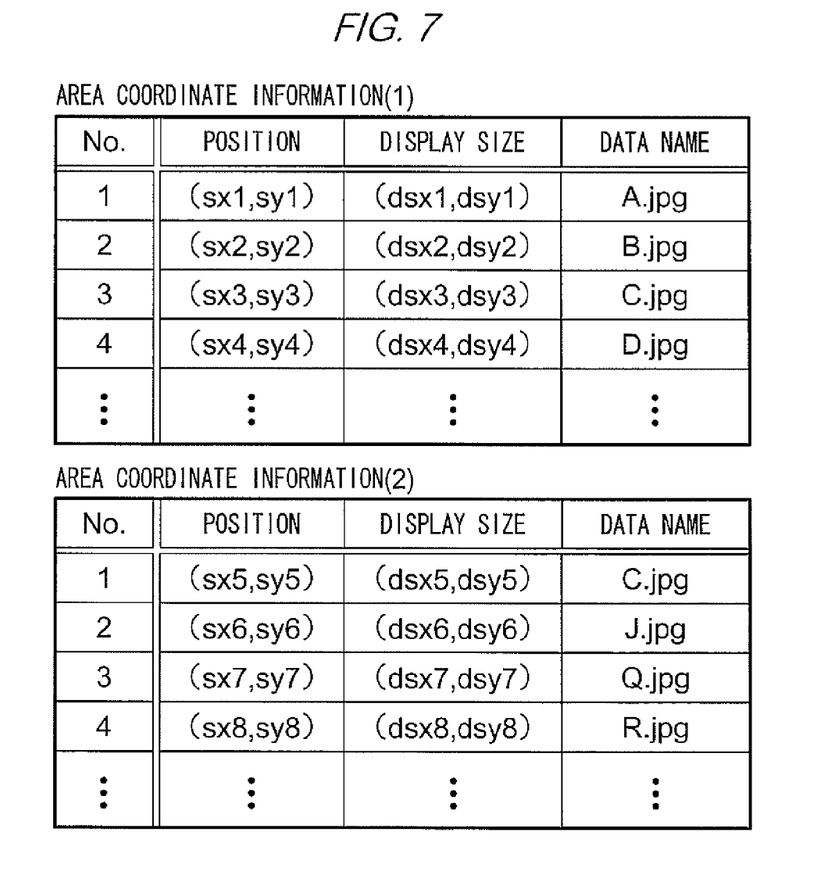
FIG. 7 is a diagram for explaining area coordinate information according to the exemplary embodiment of the present invention.

FIG. 7 is a diagram for explaining the area coordinate information. Area coordinate information (1) and (2) shown in FIG. 7 respectively correspond to pages "P1" and "P2" explained with reference to FIG. 5. Each set of area coordinate information sets forth a correspondence relationship between a sequential number assigned to each image ("No."), display position Ps ("position"), a display size of each image ("display size"), and a name of an item of image data ("data name").

For example, area coordinate information (1) shows, relative to an image whose sequential number is "3," that the "data name" is "C.jpg," the located "position" is "(sx3, sy3)", and the "display size" is "(dsx3, dsy3)." In other words, it is shown that, in page "P1," an image represented by "C.jpg" is located at a position apart from origin P0, which is the upper left position of the screen area of sub-window Ws1, by "sx3" in the positive x-direction and by "sy3" in the positive y-direction, and has a display size with a horizontal length (width) "dsx3" and a vertical length (height) "dsy3."

In the following, explanation will be continued where area coordinate information (1) and (2) shown in FIG. 7 have already been generated by area/image acquisition unit 114.

Explanation will be continued referring again to FIG. 4. Display size calculation unit 115 acquires the area coordinate information output from area/image acquisition unit 114, the screen area size information output from display control unit 112, and the screen size information output from screen size acquisition unit 110, and based on all of this information, generates calculated coordinate information, which is output to display size determination unit 116 and program generation unit 118.

Figure 8:
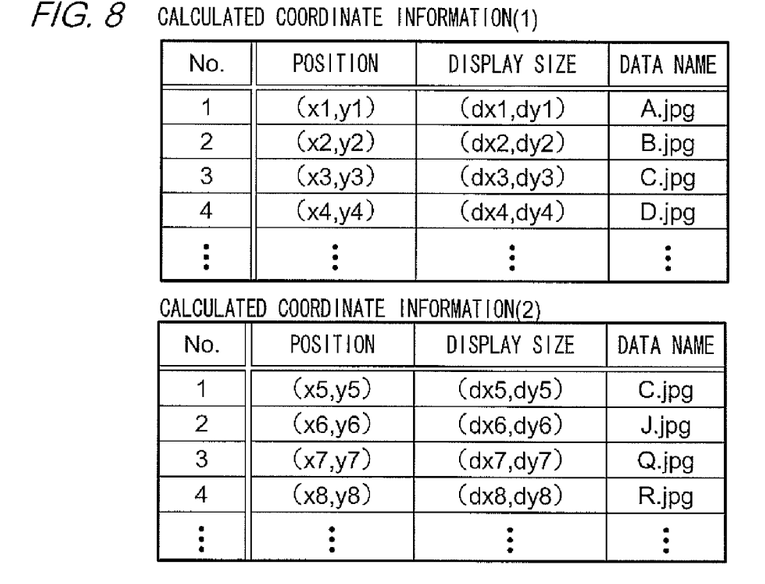
FIG. 8 is a diagram for explaining calculated coordinate information according to the exemplary embodiment of the present invention.

FIG. 8 is a diagram for explaining the calculated coordinate information. Calculated coordinate information (1) and (2) are generated in correspondence with area coordinate information (1) and (2), respectively. In contrast to the area coordinate information, which represents an arrangement of each image with respect to coordinate axes based on the screen area size of sub-window Ws1, the calculated coordinate information represents the arrangement of each image after conversion of the content of the area coordinate information in accordance with coordinate axes based on the screen size indicated by the screen size information output from screen size acquisition unit 110.

For example, in a case where the screen area size is "960× 1,280" and the screen size is "480×640," the screen size has a width and a height that are a half of a width and a height of the screen area size, and accordingly, the "position" and the "display size" indicated in the calculated coordinate information are obtained by halving the position (more specifically the numeral coordinate indicating the position) and the display size indicated in the area coordinate information. That is, in the illustrated example, calculated coordinate information (1) shows, relative to an image with the sequential number ("No.") "3," that the display position Ps is "(x3, y3)" and the size is "(dx3, dy3)," and these display position and display size are obtained by converting the corresponding content of area coordinate information (1), based on the following relationships: x3=(sx3)/2; y3=(sy3)/2; dx3=(dsx3)/2; and dy3=(dsy3)/2.

Figure 9:
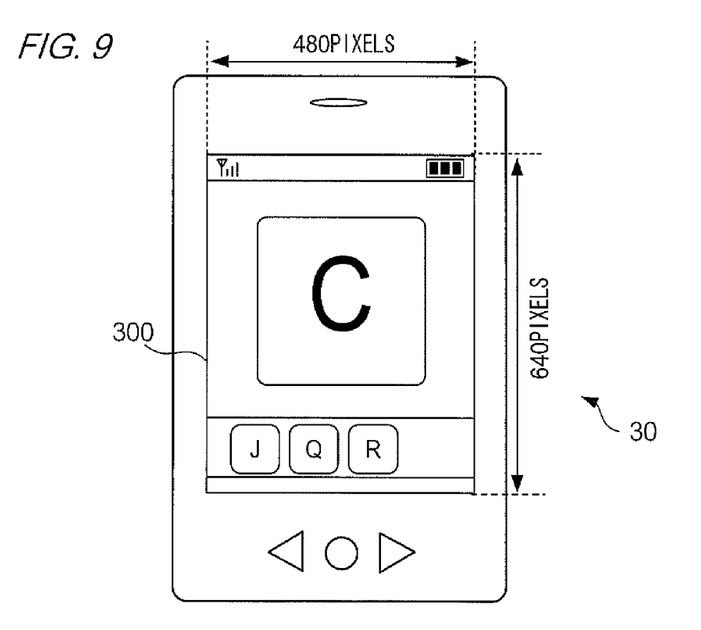
FIG. 9 is a diagram for explaining content displayed on a mobile terminal according to the exemplary embodiment of the present invention.

FIG. 9 is a diagram for explaining content of a display of mobile terminal 30, which is an example (page "P2") in which images arranged as described are displayed on display screen 300 of mobile terminal 30 whose screen size is "480× 640." Calculated coordinate information (2) corresponding to this page represents an arrangement of each image with respect to the coordinate system based on the screen size ("480×640" in this example) of display screen 300 of mobile terminal 30 of the designated model.

Explanation will be continued referring again to FIG. 4. Display size determination unit 116 acquires the calculated coordinate information from display size calculation unit 115, and executes the following determination process to instruct image data conversion unit 117 to convert an image size of image data. In the following, explanation will be given of the determination process with reference to FIG. 10.

Figure 10:
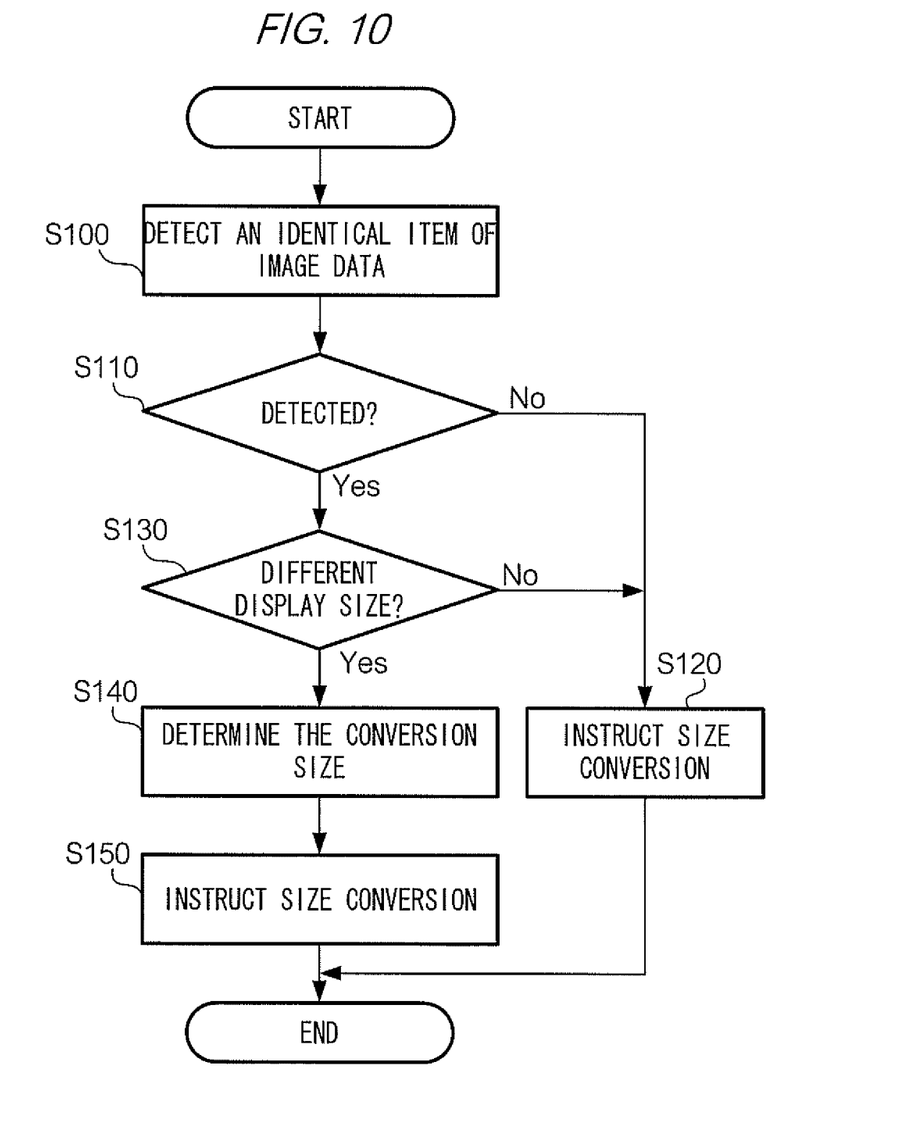
FIG. 10 is a flowchart showing a flow of a determination process according to the exemplary embodiment of the present invention.

FIG. 10 is a flowchart showing a flow of the determination process. First, display size determination unit 116 refers to "data names" in calculated coordinate information of each of the acquired pages, to detect, for each item of image data, another identical item(s) of image data (step S100), based on presence/absence of an image(s) arranged using the identical item of image data. For an item of image data for which no another identical item of image data is detected (step S110; No), display size determination unit 116 outputs to image data conversion unit 117 an instruction to convert the item of image data such that the image size becomes equal to the corresponding display size in the calculated coordinate information (step S120).

On the other hand, for an item of image data for which another identical item of image data is detected (step S110; Yes), display size determination unit 116 refers to the calculated coordinate information of each of the acquired pages to determine whether, of the identical items of image data, there are any that are associated with different display sizes (step S130).

If each of the identical items of image data is associated with the same display size (step S130; No), display size determination unit 116 outputs to image data conversion unit 117 an instruction to convert the item of image data such that the image size becomes equal to the display size (step S120). If there are identical items of image data associated with different display sizes (step S130; Yes), display size determination unit 116 determines a conversion image size based on these different display sizes (step S140). In this embodiment, the maximum one of the different display sizes is determined as the conversion image size. Then, display size determination unit 116 outputs to image data conversion unit 117 an instruction to convert the item of image data such that the image size becomes equal to the determined image size (step S150).

Explanation will now be given of the determination process with the calculated coordinate information shown in FIG. 8 being taken as an example. With regard to an item of image data whose "data name" is "A.jpg," for example, only one such item of image data is present in calculated coordinate information (1), and thus, for this item of image data, display size determination unit 116 outputs an instruction to convert the item of image data such that the image size becomes equal to the corresponding image display size "(dx1, dy1)."

On the other hand, with regard to an item of image data whose "data name" is "C.jpg," this item of image data is used in each of calculated coordinate information (1) and (2), and is associated with display sizes "(dx3, dy3)" and "(dx5, dy5)," respectively. As shown in FIGS. 5A and 5B, the latter display size is larger than the former one, and thus, for this item of image data, display size determination unit 116 outputs an instruction to convert the item of image data such that the image size becomes equal to the display size "(dx5, dy5)." The foregoing is a description of the determination process.

Explanation will be continued referring again to FIG. 4. Upon receipt of an instruction to convert each item of image data from display size determination unit 116, image data conversion unit 117 acquires each item of image data from image data acquisition unit 111 by sending a request for the item of image data to the same. Then, image data conversion unit 117 converts each acquired item of image data into an item of image data representing an image having an image size according to the respective instruction of conversion. It is to be noted that, in a case where the image display size after conversion would be larger than the image display size before the conversion, the conversion may not be performed.

Thereafter, image data conversion unit 117 provides to program generation unit 118 the items of converted image data (hereinafter, "conversion image data"). It is to be noted here that the "data name" of an item of conversion image data is changed from that assigned to the corresponding item of image data before conversion, so that they can be distinguished from one another (for example, for the item of image data before conversion whose "data name" is "C.jpg," the corresponding item of conversion image data is assigned a data name "Ct.jpg").

Program generation unit 118 generates a control program for use in mobile terminal 30 of the designated model by using the calculated coordinate information output from display size calculation unit 115 and the conversion image data output from image data conversion unit 117, and compiles the control program together with the conversion image data to generate an archive file, which is stored in storage unit 12. This archive file includes information for identifying the designated model. After the archive file is stored in storage unit 12, the stored archive file is uploaded to server 20 by control of control unit 11 or in response to a user's instruction input via operation unit 13.

The control program generated by program generation unit 118 includes a program that controls content displayed on display screen 300 of mobile terminal 30, which has been determined as described above, for each page of a series of displays shown on display screen 300 when the program is executed. The control program also includes arrangement coordinate information that represents an arrangement of each displayed image.

Figure 11:
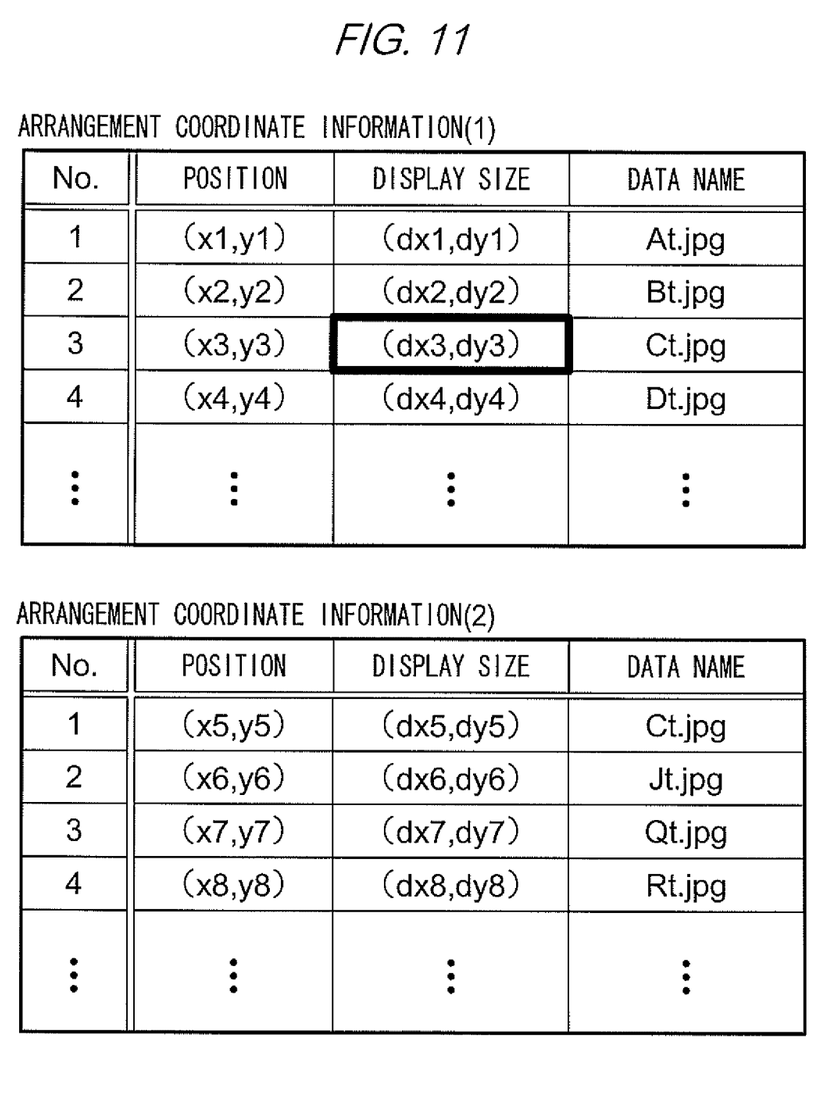
FIG. 11 is a diagram for explaining arrangement coordinate information according to the exemplary embodiment of the present invention.

FIG. 11 is a diagram for explaining the arrangement coordinate information. After acquiring the calculated coordinate information, program generation unit 118 replaces the "data name" with that indicating the conversion image data, thereby to generate the arrangement coordinate information. Arrangement coordinate information (1) and (2) are generated from calculated coordinate information (1) and (2), respectively.

When executed by mobile terminal 30, the control program generated by program generation unit 118 causes an image(s) represented by the conversion image data to be displayed in accordance with the arrangement coordinate information. That is, when the control program is executed by mobile terminal 30, the control program causes mobile terminal 30 to implement a function of causing display screen 300 to show a series of displays (display of each page), in which the conversion image data is used to display an image(s) represented by the conversion image data at the display position and in the display size set forth in the arrangement coordinate information.

In the example that uses the arrangement coordinate information shown in FIG. 11, the item of conversion image data whose "data name" is "Ct.jpg" has an image size that is already converted to be equal to the display size set forth in arrangement coordinate information (1), and therefore, this image can be displayed on display screen 300 without image size conversion being conducted in mobile terminal 30.

Also, the item of conversion image data whose "data name" is "Ct.jpg" has an image size that is already converted to be equal to the display size set forth in arrangement coordinate information (2), and therefore, when this image is displayed according to arrangement coordinate information (2), the image can be displayed on display screen 300 without image size conversion being conducted in mobile terminal 30, in the same manner as with "At.jpg."

On the other hand, the image size of the item of conversion image data whose "data name" is "Ct.jpg" is different from the display size set forth in arrangement coordinate information (1), and therefore, when this image is displayed according to arrangement coordinate information (1), the image size "(dx5, dy5)" is converted into the display size "(dx3, dy3)" in mobile terminal 30, and thereafter, the image is displayed on display screen 300.

As is described in the foregoing, in generating device 10 according to an exemplary embodiment of the present invention, when a control program and image data used by the control program are compiled, the image data is converted in advance so as to have an image size corresponding to the display size of the image, instead of using the original image data as it is. Therefore, in mobile terminal 30 that executes the control program, it is not necessary to conduct conversion of image size of the image data, and thus, a processing load on mobile terminal 30 can be reduced and an operation speed can be increased. Further, in a case where the same image is displayed multiple times in different display sizes, instead of converting an item of image data representing the image into items of image data having image sizes corresponding to all of the different display sizes before compiling, the item of image data is converted into an item(s) of image data corresponding to a part of the different display sizes before compiling, and therefore, an amount of data included in the generated archive file can be reduced.

An exemplary embodiment of the present invention has been described in the foregoing. However, the present invention may be practiced in a variety of embodiments, as described below.

In the foregoing exemplary embodiment, when a conversion image size is determined (step S140 in FIG. 10) in a case where there are multiple images of different display sizes generated from the same image data, display size determination unit 116 selects the largest one of the display sizes as the conversion image size. However, the conversion image size may be determined in another mode, so long as the conversion image size is determined based on the multiple display sizes. Described in the following are examples of other modes of determining the conversion image size.

In a first mode, display size determination unit 116 may select, as the conversion image size, a display size in a predetermined order among the multiple display sizes, such as the second largest, the third largest, or the like.

In a second mode, display size determination unit 116 may determine multiple conversion image sizes. For example, in a case where there are three different display sizes, display size determination unit 116 may select multiple display sizes, such as the maximum display size and the minimum display size, from all of the display sizes, as the conversion image sizes. In such a case, the data names of the items of conversion image data should be determined such that they can be distinguished from one another, such as "Ct1.jpg" and "Ct2.jpg," and one of them is specified as the "data name" associated with a respective image in the arrangement coordinate information.

Namely, for a respective image, an item of image data that can be displayed without image size conversion is associated with the image at the highest priority. If image size conversion is necessary, an item of image data having the maximum image size may be associated with the image, or an item of image data satisfying a relationship with the image as described below with respect to a third mode may be associated with the image.

In the third mode, the conversion image size may be determined as a size that is an integer multiple or an integer fraction of the multiple display sizes. In this way, the speed of image size conversion conducted in mobile terminal 30 when displaying an image on display screen 300 can be increased. In the following, concrete examples of the third mode will be described with reference to FIGS. 12A-12C.

Figure 12A:
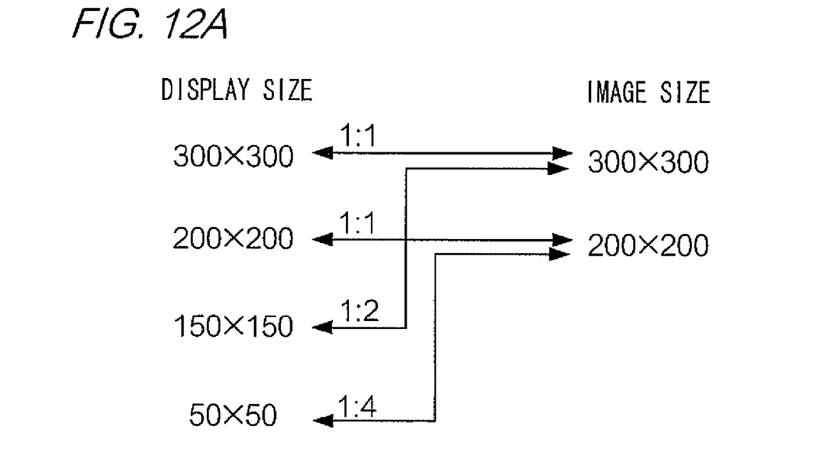
FIGS. 12A-12C are each a diagram showing a concrete example (third mode) of a conversion image size(s) according to Modification 1.
Figure 12B:
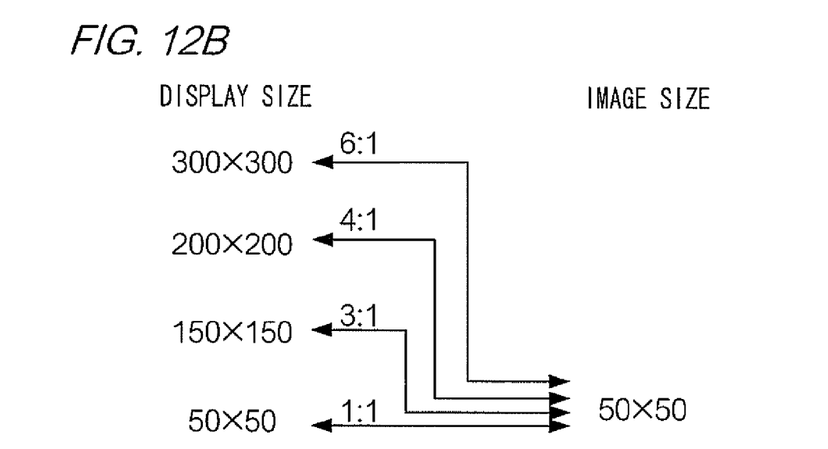
Figure 12C:
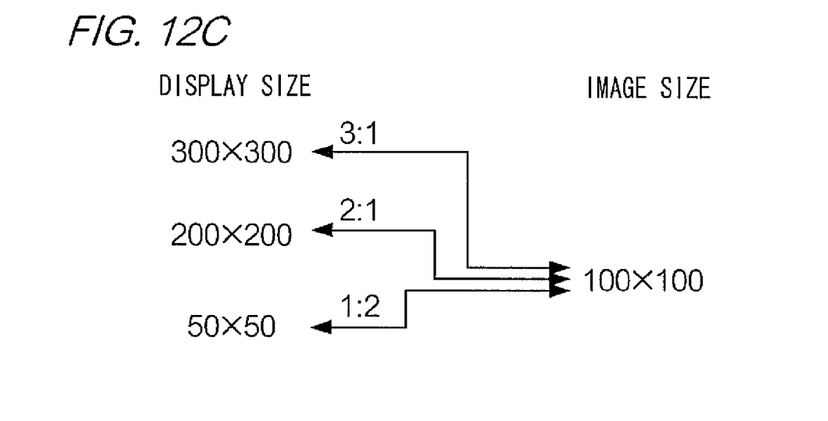

FIGS. 12A-12C are each a diagram showing a concrete example (third mode) of a conversion image size(s) according to Modification 1. FIGS. 12A and 12B show examples in which the multiple display sizes are "300×300," "200×200," "150×150," and "50×50." As a conversion image size(s) according to the third mode, multiple image sizes (i.e., "300× 300" and "200×200") may be determined as shown in FIG. 12A, or a single image size, i.e., "50×50," may be determined as shown in FIG. 12B.

On the other hand, FIG. 12C shows an example in which the multiple display sizes are "300×300," "200×200," and "50×50," and an image size (such as "100×100") that is different from any of these display sizes is determined as a conversion image size.

The mode in which the conversion image size(s) is determined can be set in display size determination unit 116 in advance by a user operation of operation unit 13 or the like. Further, when multiple cases are conceivable in each mode, one of the cases may be selected for use according to a predetermined algorithm.

For example, a degree of priority for image quality, a degree of priority for speed, a degree of priority for amount of data, and so on may be set in advance by a user operation of operation unit 13 or the like. When the degree of priority for image quality is high, the algorithm should be adapted such that many items of conversion image data tend to be generated to decrease a number of occasions that would require image size conversion conducted in mobile terminal 30. When the degree of priority for image quality is high, the algorithm should be adapted such that items of conversion image data having a large image size tend to be generated. When the degree of priority for amount of data is high, the algorithm should be adapted to generate items of conversion image data that minimize a total amount of conversion image data compiled into an archive file.

It is to be noted here that in the algorithm above, an upper limit of an amount of data may be set, and the image sizes and the number of items of conversion image data generated may be determined such that an amount of data of an archive file does not exceed the upper limit. Further, in generation of conversion image data, an instruction for conversion of an image quality and a format (JPEG (Joint Photographic Experts Group), TIFF (Tagged Image File Format), GIF (Graphic Interchange Format), etc.) may be issued in addition to conversion of the image size, to adjust an amount of the conversion image data.

In the foregoing exemplary embodiment, the same image (an image of an icon representing "C") is used in different pages in a series of displays shown on display screen 300 of mobile terminal 30. However, the present invention is not limited to such an embodiment where the same image is used in different pages, and the same image may be used in different display sizes in the same page.

In the foregoing exemplary embodiment, a control program and an archive file corresponding to mobile terminal 30 of a pre-designated model are generated. However, control programs and archive files for models with screen sizes having the same aspect ratio may be generated at the same time. In such a case, generating device 10 should be adapted to allow for designation of multiple models with screen sizes having the same aspect ratio, and each unit in the program generation function should be adapted to execute the processes for the multiple models, i.e., for the multiple screen sizes, in parallel.

In the foregoing exemplary embodiment, a displayed image is constituted of an entire part of an image represented by an item of image data. However, a displayed image may be constituted of a trimmed part of an image represented by an item of image data. In such a case, each item of coordinate information may be associated with information specifying a trimming range of an image represented by an item of image data.

When image data conversion is performed by image data conversion unit 117, extraction of the trimming range may be performed together with the image size conversion. The trimming range can be included in the instruction of conversion provided from display size determination unit 116. It is to be noted that, in a case where there are multiple trimming ranges specified for the same image, a part of the image covering all of these ranges may be extracted in the process of extraction of the trimming range. Particularly, a minimum part of the image covering all of the multiple ranges may be extracted.

Further, in the determination process performed by display size determination unit 116, for a display size for which a trimming range is specified, the process in the exemplary embodiment or Modification 1 may be performed using a display size of an image that would be displayed if the trimming were not executed. For example, in a case where an image obtained by trimming has an image size with a height and a width that are a quarter of those of an original image, the conversion image size corresponding to the trimmed image may be determined based on a display size obtained by multiplying the height and the width of the display size specified in the calculated coordinate information by four.

In the foregoing exemplary embodiment, each display size in the arrangement coordinate information is expressed as a number of pixels. However, the display size may be expressed as information that specifies the number by which the height and the width of an image represented by an item of conversion image data are multiplied.

In the foregoing exemplary embodiment, mobile terminal 30 downloads an archive file to execute a control program. However, the present invention is not limited to a mobile terminal such as a mobile phone, a PDA, or the like, but may be applied to any display device having a display screen, such as a television, a personal computer, or the like. Namely, mobile terminal 30 is an example of a display device. It is to be noted that, in case of a personal computer or the like, if a monitor providing a display screen is a separate member from the computer itself, so long as the content displayed on the monitor is controlled by the computer, it is considered that the computer and the monitor in combination constitute a display device.

The generation program in the foregoing exemplary embodiment may be provided in a state stored in a computer-readable storage medium such as a magnetic storage medium (a magnetic tape, a magnetic disk, or the like), an optical storage medium (an optical disk, or the like), a magneto-optical storage medium, a semiconductor memory, and so on. The program also may be downloaded via a network.

What is claimed is:

1. A program generation device comprising:
   a first input unit that inputs image data;
   a display controller that causes a first display to display a screen area of a second display, the second display corresponding to a client terminal;
   a second input unit that receives a designation of a first area within the screen area of the second display that is displayed in the first display, wherein the image is allocated to the first area;
   a third input unit that inputs a screen size of the second display;
   a calculation unit that calculates a position and size of a second area in which the image is located within the second display, the position and size of the second area calculated based on a position and size of the first area and the screen size of the second display;
   a determination unit that determines a reference size of the image based on the size of the second area calculated by the calculation unit;
   a converter that converts the image data to generate reference image data whose size is equivalent to the reference size determined by the determination unit;
   a generator that generates a program that includes an instruction for the terminal, the instruction including rendering a plurality of images on the first display based only on the reference image data according to the position and size calculated by the calculation unit; and
   a setting unit that sets degrees of priority for image quality, speed, and amount of data, and a number of reference image size(s) determined by the determination unit and an amount of each of the reference image size(s) determined by the determination unit are variable depending on the degrees of priority for image quality, speed, and amount of data set by the setting unit.

2. The program generation device according to claim 1, wherein the determination unit determines the reference image size such that a sum of an amount of data of the control program and an amount of data of the item of image data converted by the converter does not exceed a predetermined value.

3. The program generation device according to claim 2, wherein
   the determination unit determines a plurality of reference image sizes based on the screen sizes of the plurality of areas calculated by the calculation unit,
   the converter converts the image data into a plurality of image data sets, each image data set representing a respective one of the plurality of reference image sizes, and
   the generator uses the plurality of image data sets.

4. The program generation device according to claim 2, wherein the determination unit determines the reference image size as having a size having a height and a width that respectively are an integer multiple or an integer fraction of a height and a width of the screen size of each of the plurality of areas.

5. The program generation device according to claim 2, wherein
   the second input unit further designates a trimming range of the reference image for each of the plurality of areas, and
   the generator generates a control program for causing the display to display the reference image in the trimming range at the display position corresponding to each of the plurality of areas, after converting the reference image in the trimming range to have an image size equal to the screen size.

6. The program generation device according to claim 2, wherein the reference image size is smaller than the predetermined image size of the reference image represented by the item of image data acquired by the image data acquisition unit.

7. The program generation device according to claim 2, wherein the determination unit determines the reference image size is equivalent to one of the screen sizes of the plurality of areas.

8. The program generation device according to claim 2, wherein the determination unit determines the reference image size is equivalent to a size other than the screen sizes of the plurality of areas.

9. The program generation device according to claim 1, wherein the determination unit determines a plurality of reference image sizes based on the screen sizes of the plurality of areas calculated by the calculation unit, the converter converts the image data into a plurality of image data sets, each image data set representing a respective one of the plurality of reference image sizes, and the generator uses the plurality of image data sets.

10. The program generation device according to claim 9, wherein the determination unit determines a number of the plurality of reference image sizes such that a sum of an amount of data of the control program and an amount of data of the plurality of image data sets does not exceed a predetermined value.

11. The program generation device according to claim 1, wherein the determination unit determines the reference image size as having a size having a height and a width that respectively are an integer multiple or an integer fraction of a height and a width of the screen size of each of the plurality of areas.

12. The program generation device according to claim 1, wherein the second input unit further designates a trimming range of the reference image for each of the first area and the second area, and the generator generates a program for causing the display to display the reference image in the trimming range at the display position corresponding to each of the plurality of areas, after converting the reference image in the trimming range to have an image size equal to the screen size.

13. The program generation device according to claim 1, wherein the reference image size is smaller than a predetermined image size of the reference image represented by the item of image data.

14. The program generation device according to claim 1, wherein the determination unit determines the reference image size is equivalent to one of the screen sizes of the plurality of areas.

15. The program generation device according to claim 1, wherein the determination unit determines the reference image size is equivalent to a size other than the screen sizes of the plurality of areas.

16. A non-transitory computer-readable storage medium storing a program for causing a computer to generate a control program, the program causing the computer to function as:

a first input unit that inputs image data;

a display controller that causes a first display to display a screen area of a second display, the second display corresponding to a client terminal;

a second input unit that receives a designation of a first area within the screen area of the second display that is displayed in the first display, wherein the image is allocated to the first area;

a third input unit that inputs a screen size of the second display;

a calculation unit that calculates a position and size of a second area in which the image is located within the second display, the position and size of the second area calculated based on a position and size of the first area and the screen size of the second display;

a determination unit that determines a reference size of the image based on the size of the second area calculated by the calculation unit;

a converter that converts the image data to generate reference image data whose size is equivalent to the reference size determined by the determination unit;

a generator that generates an instruction for the terminal, the instruction including rendering a plurality of images on the first display based only on the reference image data according to the position and size calculated by the calculation unit; and a setting unit that sets degrees of priority for image quality, speed, and amount of data, and a number of reference image size(s) determined by the determination unit and an amount of each of the reference image size(s) determined by the determination unit are variable depending on the degrees of priority for image quality, speed, and amount of data set by the setting unit.

17. A program generation method of generating a control program, the method comprising:

a first input step for inputting image data;

a display control step for causing a first display to display a screen area of a second display, the second display corresponding to a client terminal;

a second input step for receiving a designation of a first area within the screen area of the second display that is displayed in the first display, wherein the image is allocated to the first area;

a third input unit step for inputting a screen size of the second display;

a calculation step for calculating a position and size of a second area in which the image is located within the second display, the position and size of the second area calculated based on a position and size of the first area and the screen size of the second display;

a determination step for determining a reference size of the image based on the size of the second area calculated by the calculation unit;

a conversion step for coverting the image data to generate reference image data whose size is equivalent to the reference size determined by the determination unit; and a generation step for generating a program that includes an instruction for the terminal, the instruction including rendering a plurality of images on the first display based only on the reference image data according to the position and size calculated by the calculation unit; and a setting step that sets degrees of priority for image quality, speed, and amount of data, and a number of reference image size(s) determined by the determination unit and an amount of each of the reference image size(s) determined by the determination unit are variable depending on the degrees of priority for image quality, speed, and amount of data set by the setting unit.

* * * * *